United States Patent
Ranganathan et al.

(10) Patent No.: US 9,883,395 B2
(45) Date of Patent: Jan. 30, 2018

(54) SECURELY ACCESSING SECURE ELEMENTS

(71) Applicant: GOOGLE INC., Mountain View, CA (US)

(72) Inventors: Balamourougan Ranganathan, Cumming, GA (US); Hiteshkumar M. Shah, Plano, TX (US); Pascal Taillon, Pierrefonds (CA)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 14/952,776

(22) Filed: Nov. 25, 2015

(65) Prior Publication Data

US 2016/0150410 A1    May 26, 2016

Related U.S. Application Data

(60) Provisional application No. 62/084,349, filed on Nov. 25, 2014.

(51) Int. Cl.
| | |
|---|---|
| *H04W 12/06* | (2009.01) |
| *H04W 8/20* | (2009.01) |
| *H04W 76/02* | (2009.01) |

(52) U.S. Cl.
CPC ............ *H04W 12/06* (2013.01); *H04W 8/205* (2013.01); *H04W 76/028* (2013.01); *H04L 2463/102* (2013.01)

(58) Field of Classification Search
CPC ... H04W 12/06; H04W 76/028; H04W 8/205; H04L 2463/102

USPC ......................................................... 455/410
See application file for complete search history.

(56) References Cited

U.S. PATENT DOCUMENTS

| | | | | |
|---|---|---|---|---|
| 8,646,059 | B1 * | 2/2014 | von Behren | G06Q 20/367 719/311 |
| 2009/0307142 | A1 * | 12/2009 | Mardikar | G06Q 20/1085 705/72 |
| 2012/0129452 | A1 * | 5/2012 | Koh | G06Q 20/352 455/41.1 |
| 2012/0159195 | A1 * | 6/2012 | von Behren | G06Q 20/3552 713/193 |
| 2013/0109308 | A1 * | 5/2013 | Singh | H04L 67/34 455/41.1 |
| 2013/0111598 | A1 * | 5/2013 | Marcovecchio | H04L 67/34 726/26 |

(Continued)

*Primary Examiner* — Nathan Taylor
(74) *Attorney, Agent, or Firm* — Johnson, Marcou & Isaacs, LLC

(57) ABSTRACT

Direct management of secure element data life cycles by backend servers without requiring direct communications between a trusted service manager (TSM) and a secure element is provided. A backend server client application executing on a mobile computing device enables users to request loading of application data on the secure element. A backend server receives the request to load application data. The backend server requests command scripts needed to load application data from the TSM and encrypts the command scripts with data stored on the backend server. The encrypted command scripts and application data are communicated to the backend server client application, which executes the command scripts and loads the application data onto the secure element via an interface of the mobile computing device.

16 Claims, 3 Drawing Sheets

(56) References Cited

U.S. PATENT DOCUMENTS

2013/0262302 A1* 10/2013 Lettow ................. G06Q 20/027
                                                        705/41
2015/0073996 A1*  3/2015 Makhotin .............. G06Q 20/02
                                                        705/71

* cited by examiner

SECURELY ACCESSING SECURE ELEMENTS

RELATED APPLICATIONS

This application claims priority to U.S. Provisional Patent Application No. 62/084,349 filed Nov. 25, 2014 and entitled "Systems, Methods and Computer Program Products for Securely Accessing Secure Elements," the complete disclosure of which is hereby fully incorporated herein by reference.

TECHNICAL FIELD

The present disclosure relates to accessing secure elements of computing devices. In particular, the present disclosure relates to accessing secure elements of computing devices without direct communication between a Trusted Services Manager (TSM) and a secure element.

BACKGROUND

Currently, instance creation, secure domain creation, key rotation, and personalization of applets and other data on secure elements is performed by a Trusted Services Manager (TSM) server using, for example, bearer independent protocol (BIP). A communication link between a computing device comprising a secure element and TSM server is usually established via a Type 2 text message that indicates the applet that needs to be loaded and a link to get started. Afterwards, a slightly longer process takes places where the TSM communicates longer commands, such as the commands needed for the actual loading of the applet onto the secure element. All of this communication takes place in the background of an operating system on a computing device. However, if the BIP communication is interrupted, for example, when a user loses cellular or wireless network access, the TSM has to roll back the loading process and wait until a network connection is reestablished to re-start the loading process.

SUMMARY

In certain example embodiments described herein, a method for managing secure elements on mobile computing devices comprises receiving, at a backend server, a request from a backend server client application executing on a mobile computing device to load application data on a secure element, communicating by the backend server a request for loading instructions for the application data to a TSM server, receiving by the backend server a data package from the TSM server comprising the loading instructions, communicating the loading instructions and requested application data to the backend server client application, and loading by the backend server client application of the application data onto the secure element by executing the loading instructions and communicating the requested application data to the secure element via a contact interface of the mobile computing device.

These and other aspects, objects, features, and advantages of the example embodiments will become apparent to those having ordinary skill in the art upon consideration of the following detailed description of illustrated example embodiments.

DETAILED DESCRIPTION OF THE EXAMPLE EMBODIMENTS

Overview

Figure 1:
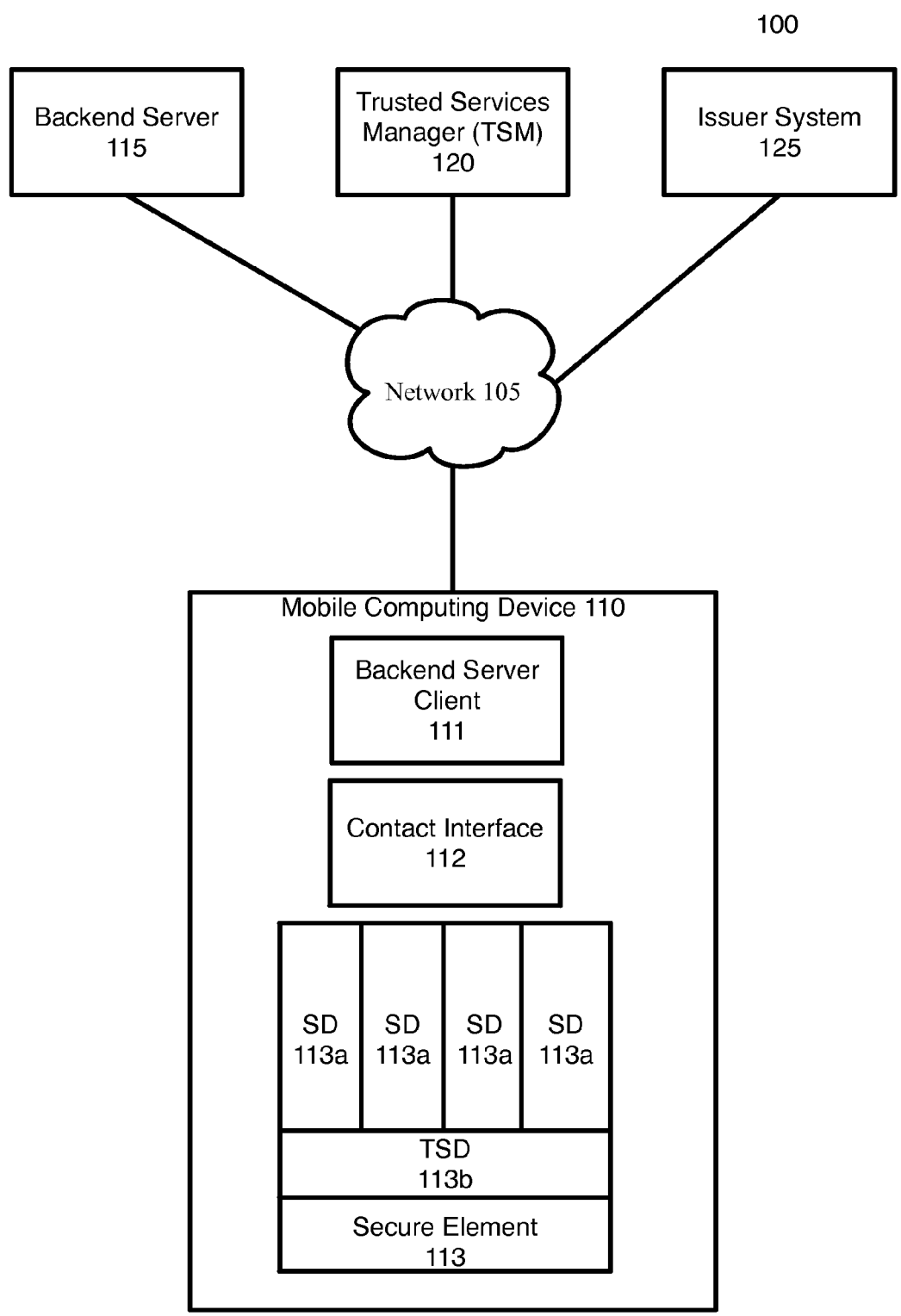
FIG. 1 is a block diagram depicting a system for managing secure elements on mobile computing devices, in accordance with certain example embodiments.

Embodiments herein provide computer-implemented techniques for managing secure elements on mobile computing devices. The embodiments disclosed herein enable a backend server, such as an electronic wallet server, to more efficiently manage the data life cycle of a secure element. Applets and other application data can be added directly to a secure element via a backend server without requiring a connection between the secure element and a TSM server. A backend server client application, such as a wallet client, executing on a mobile computing device allows a user to initiate a request to add or update information on the secure element to the backend server. In most instances, the backend server has the requested data and simply requests the loading instructions needed to load the particular requested application data on the secure element from a TSM server. However, in some instances the backend server may also request the application data along with the loading instructions from the TSM server. The backend server then encrypts the data and loading instructions received from the TSM server and communicates the encrypted package to the backend server client. The backend server client is configured to communicate with the secure element via a contact interface of the mobile computing device, such as a NFC contact interface. The server client decrypts the data package, executes the command scripts in the loading instructions, and communicates the data to the secure element via the contact interface.

Traditionally, secure elements are managed remotely by a third-party TSM server, which requires the establishment of communication channel between the TSM server and the secure element, typically using type 2 text message communications. In turn, the TSM server is dependent on a response from the secure element to proceed with data updates. If the connection between the TSM and secure element is not successful or is interrupted, for example, because the mobile computing device loses network access, then the TSM has to reestablish a connection, roll back the previous loading attempt, and restart the process. This process results in delays and inefficiencies in managing data stored on a secure element. To address this deficiency, embodiments described herein eliminate the need for direct TSM to secure element communications, and can add intelligence to secure element management. For example, if a user wants to add a new payment instance to the secure element, the system may prompt the user to verify access to network coverage for the time necessary to update the secure element, or to schedule the download at a later time. Accordingly, the backend server is updated at all times on the loading status of the requested application data and does not have to wait for on unreliable communications from the secure element. As such, the systems and methods described herein may be employed to manage all aspects of a secure element, including loading of applets, personalization of the secure element, creating and deleting payment instances, and rotation of keys, while avoiding inefficiencies in existing systems resulting from interruptions in direct TSM to secure element communications.

Turning now to the drawings, in which like numerals represent like (but not necessarily identical) elements throughout the figures, example embodiments are described in detail.

Example System Architectures

FIG. 1 is a block diagram depicting a system 100 for managing secure elements, in accordance with certain example embodiments. As depicted in FIG. 1, the system 100 includes network computing devices 110, 115, 120, and 125 that are configured to communicate with one another via one or more networks 105. In some embodiments, a user associated with a device must install a user interface application 111 and/or make a feature selection to obtain the benefits of the techniques described herein.

The user computing device 110 comprises a backend server client application 111, a contact interface 112, and a secure element 113. In certain example embodiments, the backend server client application 111 is a wallet client application that allows an end user to access and manage an electronic wallet account stored on the backend server 115. The wallet client application 111 may be a web browser or a standalone application installed on the mobile computing device. The terms wallet client application and wallet client are used interchangeably herein. The contact interface 112 may be an NFC contact interface. The contact interface 112 has access to the secure element 113 to read and write information to the secure element 113. In certain example embodiments, the contact interface 112 may communicate via an antenna outside of the device 110. The secure element 113 may comprise one or more security domains (SD) 113a. The security domains 113a are used for storing service provider applications or application data on the secure element. For example, each security domain 113a may be used to store data form a different credit card issuer. In certain example embodiments, one of the security domains 113a may be traditionally dedicated for use by a trusted service manager domain (TSD) 113b. The TSD 113b may be managed by the issuer of the secure element 113.

Each network 105 includes a wired or wireless telecommunication means by which network devices (including devices 110, 115, 120, and 125) can exchange data. For example, each network 105 can include a local area network ("LAN"), a wide area network ("WAN"), an intranet, an Internet, a mobile telephone network, or any combination thereof. Throughout the discussion of example embodiments, it should be understood that the terms "data" and "information" are used interchangeably herein to refer to text, images, audio, video, or any other form of information that can exist in a computer-based environment.

Each network device 110, 115, 120, and 125 includes a device having a communication module capable of transmitting and receiving data over the network 105. For example, each network device 110, 115, 120, and 125 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network devices (including devices 110, 115, 120, and 125) are operated by end-users or consumers (not depicted), backend server operators (not depicted), TSM system operators (not depicted), and issuer system operators (not depicted), respectively.

It will be appreciated that the network connections shown are example and other means of establishing a communications link between the computers and devices can be used. Moreover, those having ordinary skill in the art having the benefit of the present disclosure will appreciate that the backend server 115, TSM server 120, issuer system 125, and the mobile computing device 110 illustrated in FIG. 1 can have any of several other suitable computer system configurations. For example, a mobile computing device 110 embodied as a mobile phone or handheld computer may not include all the components described above.

Figure 3:
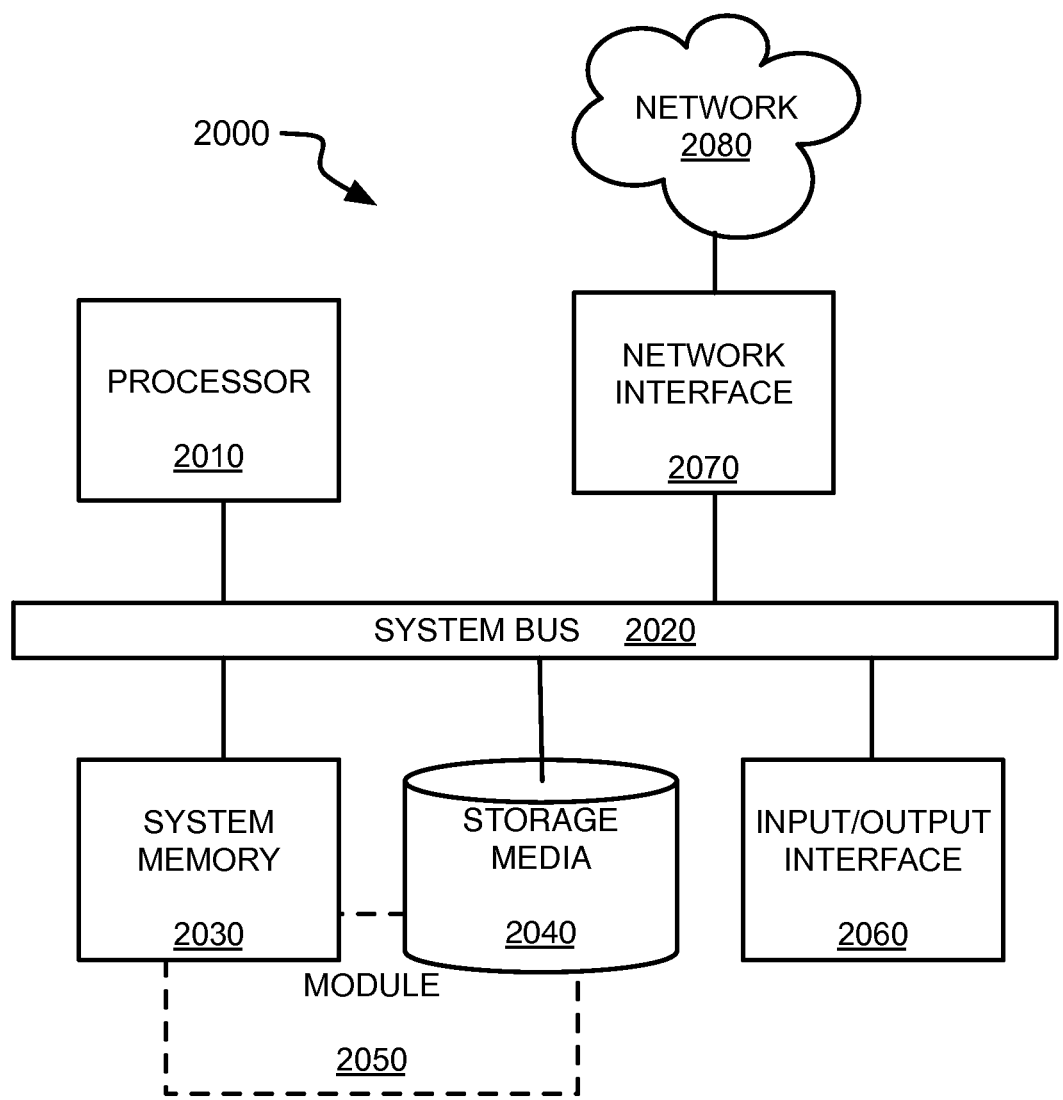
FIG. 3 is a block diagram depicting a computing machine and a module, in accordance with certain example embodiments.

In example embodiments, the network computing devices and any other computing machines associated with the technology presented herein may be any type of computing machine such as, but not limited to, those discussed in more detail with respect to FIG. 3. Furthermore, any components associated with any of these computing machines, such as components described herein or any other components (scripts, web content, software, firmware, modules, or hardware) associated with the technology presented herein may by any of the components discussed in more detail with respect to FIG. 3. The computing machines discussed herein may communicate with one another as well as other computer machines or communication systems over one or more networks, such as network 105. The network 105 may include any type of data or communications network, including any of the network technology discussed with respect to FIG. 3.

Example Processes

Figure 2:
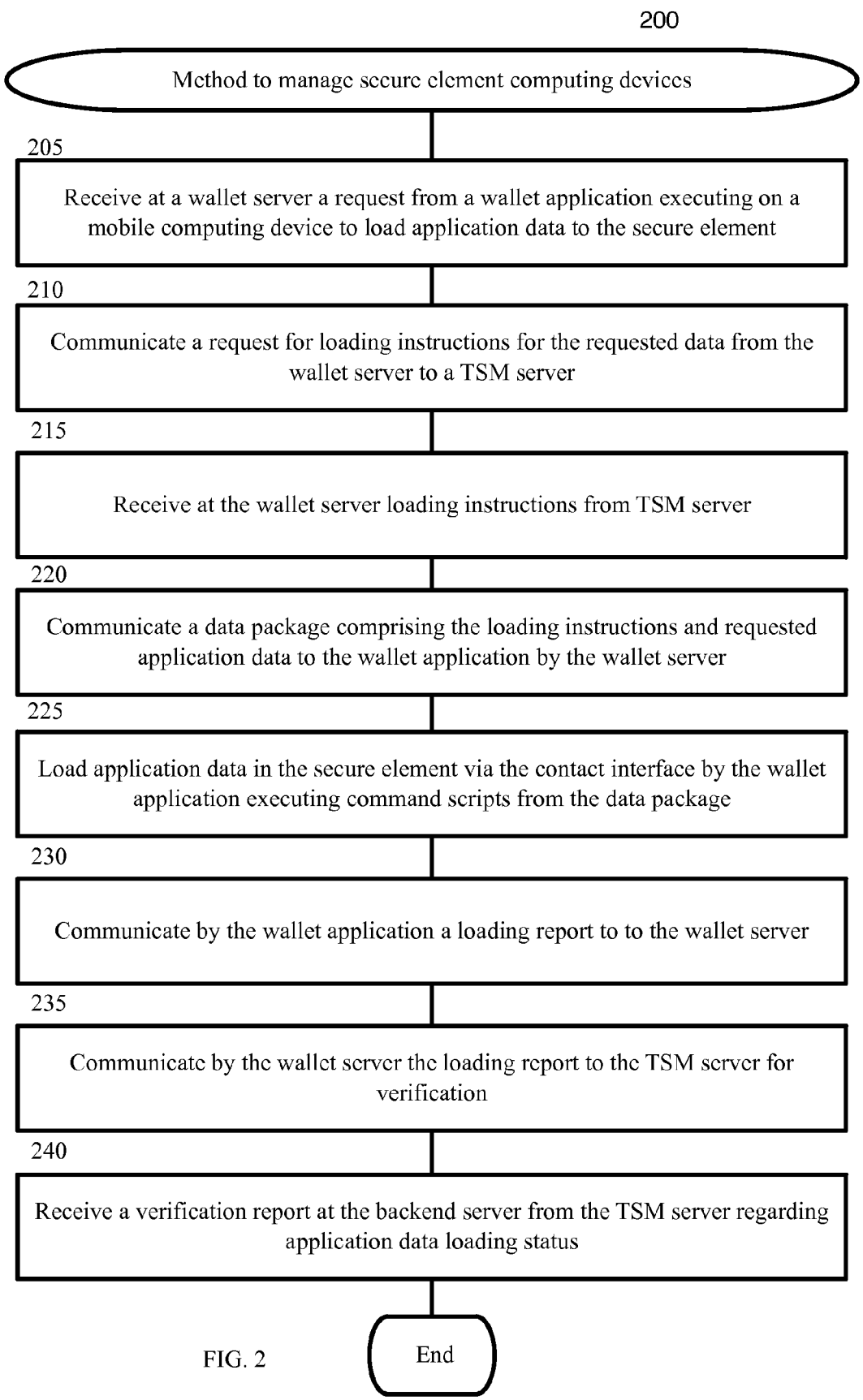
FIG. 2 is a block flow diagram depicting a method to mange secure elements on mobile computing devices, in accordance with certain example embodiments.

The example methods illustrated in FIG. 2 are described hereinafter with respect to the components of the example operating environment 100. The example method of FIG. 2 may also be performed with other systems and in other environments.

FIG. 2 is a block flow diagram depicting a method 200 to manage secure elements, in accordance with certain example embodiments. For ease of reference, method 200 will be discussed in the context of a wallet server as the backend server 115, a wallet client as the backend server client application 111, and management of the secure element in the context of managing payment account information stored on the secure element. However, other systems that need to manage the data life cycle of secure elements could be used in substantially the same way. Likewise, as noted previously, other background maintenance functions not requiring direct user input, like rotation of security keys and reinstallation of expired payment instances on the secure element, may be performed using the embodiments disclosed herein.

Method 200 begins at block 205, where a wallet server 115 receive a request from a wallet client application 111 executing on a user computing device 110 to update application data stored in a secure element 113 of the mobile computing device 110. In certain example embodiments, the request may be to add a new payment instance to the secure element. For example, a user may wish to add a new payment instance for a credit card to the secure element of the mobile computing device 110. The user launches the wallet client 111 and selects an option to add a payment instance, delete a payment instance, or modify an existing instance. In certain example embodiments, the request may be to renew or update an expired existing payment instance. In certain other example embodiments, the request may be to rotate one or more keys needed to manage data on the secure element 113. Certain requests, such as the rotation of one or more keys and other similar ongoing maintenance functions, may be initiated by the wallet client 111 or wallet server 115 at regularly defined intervals without user input. The embodiments disclosed herein may be used to perform all secure element life-cycle functions, including installation, instantiation, starting, stopping, destroying, updating, activating, de-activating, swapping of secure domains and memory blocks, changing of access keys, and changing access bits for the access conditions.

At block 210, the wallet server 115 communicates the request to update the secure element to a TSM computing device 120. The request to update the secure element 113 will include a request for the application data. In certain example embodiments, the wallet server 115 maintains the application data, such as credit card data, and will send a request to the TSM server 120 for only the command scripts needed to update the requested application data on the secure element 113. In certain other example embodiments, the application data is stored on the TSM server 120. In which case, the wallet server 115 will request both the application data and the command scripts needed to load the application data. The wallet server 115 may encrypt the data using a security key prior to communicating the request to the TSM server 120. For example, the wallet server may use a private key of a private-public key pair to encrypt the request for application data to the secure element.

At block 215, the wallet server 115 receives an encrypted package comprising the requested command scripts and/or application data needed to install or update the application data on the secure element 113 from the TSM server 120. If the wallet server 115 maintains the application data, the wallet server will encrypt the application data with the command scripts received from the TSM server 120. If the wallet server 115 receives the application data and the command scripts from the TSM server 120, the wallet server 115 may first decrypt the encrypted data package received from the TSM server 120 and re-encrypt the data package with a key from a second key pair shared with the wallet client 111.

At block 220, the wallet server 115 communicates the encrypted data package to the wallet client 111 on the mobile computing device 110. In certain example embodiments, the wallet server 115 may first communicate instructions to the wallet client 111 on the user computing device 110 to display a message. The message may be in the form of a user interface for soliciting feedback from a user. For example, the displayed user interface may request that the user verify that they will have cellular or Wi-Fi access for a certain time, such as the expected time frame needed to update the requested application data on the secure element 113. In certain example embodiments, the user interface may allow the user to set a later time to initiate the update to the secure element, if network access cannot currently be maintained for the desired amount of time.

At block 225, the wallet client 111 decrypts the encrypted package received from the wallet server 115 and executes the command scripts to load the requested application data. The user interface application 111 is configured to communicate with the secure element through the contact interface 112 allowing the user interface application to communicate with the secure element 113 to pass data and commands to the secure element 113. In certain example embodiments, the contact interface 111 may be an NFC contact interface 112 in communication with the secure element 113. For example, the wallet client 111 may include an existing API for communicating with the secure element 113 via the NFC contact interface 112.

At block 230, the wallet client 111 communicates a loading report received from the secure element 113 to the wallet server 115. The loading report may comprise feedback typically sent from a secure element 113 to a TSM server 120, such as messages indicating successful loading of application data or various error reports.

At block 235, the wallet server 115 communicates the loading report to the TSM server 120 for interpretation of the messages contained within the loading report.

At block 240, the wallet server 115 receives a verification notification from the TSM server 120. The verification notification indicates if the update to application data on the secure element was successful or not. In certain example embodiments, the wallet server 115 may communicate a message to the wallet client 111 for display on the user computing device 110 to inform the user of the final status of the request.

Other Example Embodiments

FIG. 4 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, biometric readers, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the invention claimed herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to access secure elements on mobile computing devices, comprising:
    receiving, at one or more computing devices and from a backend server client application executing on a mobile computing device, a request to load application data onto a secure element of the mobile computing device;
    communicating, using the one or more computing devices, a request for loading instructions needed to load the requested application data onto the secure element to a trusted service manager (TSM) server;
    receiving, at the one or more computing devices, the loading instructions from the TSM server, the loading instructions comprising one or more computer executable scripts for loading the application data onto the secure element;
    communicating, by the one or more computing devices, the loading instructions and the requested application data to the backend server client application executing on the mobile computing device;
    receiving, by the backend server client application, the loading instructions and the requested application data from the one or more computing devices;
    loading, by the backend server client application of the mobile computing device, the application data received by the backend server client application from the one or more computing devices, onto the secure element of the mobile computing device by executing the loading instructions and communicating the requested application data to the secure element of the mobile computing device.

2. The method of claim 1, further comprising:
    receiving, at the one or more computing devices, a loading report from the backend server client application of the mobile computing device after an attempt to load the application data in the secure element of the mobile computing device, the loading report comprising one or more messages regarding the success or failure of loading the application data;
    communicating, by the one or more computing devices, the loading report to the TSM server for verification; and
    receiving, at the one or more computing devices, a verification notification from the TSM server, the verification notification indicating whether the attempt to load the application data to the secure element of the mobile computing device failed or succeeded.

3. The method of claim 1, further comprising: communicating, by the one or more computing, devices, computer-executable instructions to the backend server client application to display a feedback request on a user interface of the user computing device.

4. The method of claim 3, wherein the feedback request comprises a request to confirm network access for a defined time period, or a request to continue or delay loading of the application data.

5. The method of claim 1, wherein the one or more computing devices are an electronic wallet server, and wherein the backend server client application is a wallet application.

6. The method of claim 1, wherein the application data comprises payment account information, a rotation of keys from the TSM server, a re-upload of an expired payment instance, or deletion of an existing payment instance.

7. The method of claim 1, wherein the one or more computing devices, encrypt the requested application data and the one or more executable program instructions from the TSM server prior to communicating the application loading instructions and the requested application data to the backend server client application on the mobile computing device.

8. The method of claim 1, wherein the application data is payment account information.

9. A computer program product, comprising:
    a non-transitory computer-readable storage device having computer-executable program instructions embodied thereon that when executed by a computer cause the computer to manage secure elements on mobile computing devices, the computer-executable program instructions comprising:
        computer-executable program instructions to receive a request from a backend server application executing on a mobile computing device to load application data onto a secure element;

computer-executable program instructions to communicate a request for loading instructions needed to load the requested application data onto the secure element to a TSM server;

computer-executable program instructions to receive the loading instructions from the TSM server; and computer-executable program instructions to encrypt and communicate the loading instructions and requested application data to the backend server client application executing on a mobile computing device for loading onto the secure element, wherein the backend server client application executes the program instructions and communicates the application data to the secure element via a contact interface on the mobile computing device.

10. The computer program product of claim 9, wherein the computer is an electronic wallet server.

11. The computer program product of claim 9, wherein the application data comprises payment account information, a rotation of security keys, re-loading of an expired payment instance, or deletion of an existing payment instance.

12. The computer program product of claim 9, wherein the request for loading instructions further comprises a request for the application data.

13. A system to manage secure elements on mobile computing devices, comprising:

a backend server application executing on a mobile computing device, the mobile computing device comprising a secure element and a contact interface in communication with the secure element; and a storage device and a processor communicatively coupled to the storage device, wherein the processor executes application code instructions that are stored in the storage device to cause the system to:

receive a request to load application data onto a secure element from a mobile computing device;

communicate a request for loading instructions needed to load a type of application data onto the secure element to a TSM server;

receive the loading instructions from the TSM server;

encrypt a data package comprising the loading instructions and application data using a security key of a security key pair;

communicate the encrypted data package to a client application, wherein the client application decrypts the data package, executes the loading instructions, and communicates the application data to the secure element via the contact interface.

14. The system of claim 13, wherein the processor further executes application code instructions that cause the system to:

receive a loading report from the client application, the loading report comprising one or more messages regarding application data loading status;

communicate the loading report to the TSM sever for verification; and receive a verification notification from the TSM sever, the verification notification indicating whether the attempt to load the application data failed or succeeded.

15. The system of claim 13, wherein the storage device is an electronic wallet server.

16. The system of claim 13, wherein the application data comprises payment account information, a rotation of security keys, re-loading of an expired payment instance, or deletion of an existing payment instance.

* * * * *